UNITED STATES PATENT OFFICE 2,202,040

SULPHUR DYESTUFF DERIVED FROM INDOPHENOLS

Werner Zerweck, Frankfort-on-the-Main-Fechenheim, and Wilhelm Hechtenberg, Frankfort-on-the-Main, Germany, assignors to General Aniline & Film Corporation, a corporation of Delaware No Drawing. Application February 9, 1938, Serial No. 189,542. In Germany February 13, 1937

2 Claims. (Cl. 260—133)

Our invention relates to valuable new sulphur dyestuffs derived from indophenols, more particularly to those derived from leuco-indophenols of the general formula:

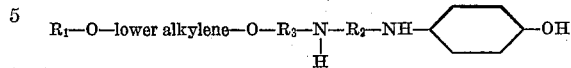

wherein $R_1$ stands for a member selected from the group consisting of hydrogen and lower alkyl, $R_2$ for a member of the group consisting of phenylene and naphthylene and $R_3$ for a radicle of the benzene series.

The new dyestuffs are obtained by treating with a sulphurizing agent, according to the methods customary for the manufacture of sulphur dyestuffs, a leucoindophenol of the above formula or the corresponding indophenols.

The new dyestuffs dye the vegetable fiber from the sodium sulphide bath greenish shades of good fastness properties.

In order to further illustrate our invention the following examples are given, the parts being by weight and all temperatures in degrees centigrade, but we wish it, however, to be understood that our invention is not limited to the examples given nor to the exact conditions stated therein.

Example 1

10 parts of a leucoindophenol of the formula:

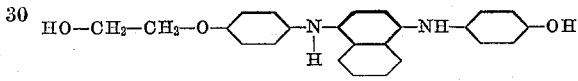

derived from 4'-hydroxyethoxyphenyl-1-naphthylamine, which latter compound is obtainable by condensing according to known methods 1-naphthol with 4-aminophenylglycolether, and melts at 161° when recrystallized from chlorobenzene, are mixed with a polysulphide from 18 parts of concentrated sodium sulphide and 22 parts of sulphur, about 75 parts of butyl alcohol and 6 parts of copper sulphate and the mixture is heated for some hours under reflux. The butyl alcohol is distilled off and the dyestuff formed is isolated. It is when dry a dark powder soluble in concentrated sulphuric acid with a greenish blue color and dyes vegetable fibers from a sodium sulphide bath bright and fast green shades which are clearer and more yellowish than those of the corresponding dyestuffs derived from the leucoindophenols from 4'-methoxy- or 4'-ethoxy-phenyl-1-naphthylamine.

When starting from the analogous leucoindophenols of the formulae:

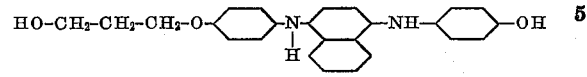

and

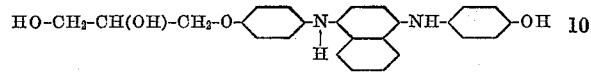

derived from 4'-(γ-hydroxypropyl) oxyphenyl-1-naphthylamine and 4'-(β-γ-dihydroxypropyl)-oxyphenyl-1-naphthylamine respectively similar dyestuffs of the same valuable properties are obtained.

When starting from the leucoindophenol derived from 4'-methoxyethoxyphenyl-1-naphthylamine of the formula:

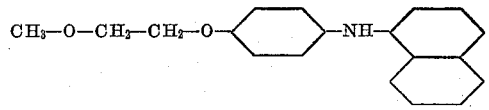

(which compound is obtainable according to known methods by condensing 1-naphthylamine with paraaminophenylglycolmethylether and melts at about 99° when recrystallized from carbon tetrachloride) and subjecting such a leucoindophenol to the above described sulphurizing process the formed dyestuff dyes the vegetable fibers from a sodium sulphide bath bright green shades which are somewhat more yellowish than those of the dyestuff at first described in this example.

Example 2

10 parts of the indophenol or leucoindophenol derived from 4-hydroxyethoxydiphenylamine of the formula:

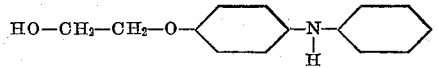

(which compound is obtainable according to known methods by condensing para-aminophenylglycolether with ortho-chlorobenzoic-acid and splitting off the carboxy group and melts at about 89 to 90° when recrystallized from benzene) are mixed with an alcoholic polysulphide solution from 10 parts of sodium sulphide and 12 parts of sulphur and the mixture is boiled in an apparatus provided with a reflux condenser for some time. When the dyestuff formation has been finished the alcohol is distilled off and the dyestuff is isolated in the usual manner. It is when dry a dark powder scarcely soluble in concentrated sulphuric acid with a greenish blue color and dyes the vegetable fibers from a sodium sulphide bath greenish blue shades.

Similar dyestuffs are obtained by starting for example from the indophenols or leucoindophenols derived from 4-methyl-3-hydroxy-ethoxy-diphenylamine or 4-chloro-2-hydroxy-ethoxy-diphenyl-amine.

We claim:

1. Sulphur dyestuffs obtained by treating with a sulphurizing agent, according to the method customary for the manufacture of sulphur dyestuffs, a leucoindophenol of the general formula:

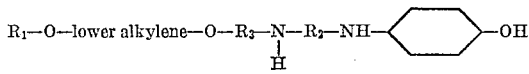

wherein $R_1$ stands for a member selected from the group consisting of hydrogen and lower alkyl, $R_2$ for a member of the group consisting of phenylene and naphthylene and $R_3$ for a radicle of the benzene series which dyestuffs dye the vegetable fiber from the sodium sulphide bath greenish shades of good fastness properties.

2. A sulphur dyestuff, obtained by treating with a sulphurizing agent according to the method customary for the manufacture of sulphur dyestuffs the leucoindophenol of the formula:

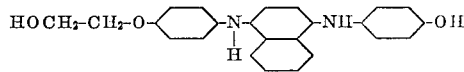

which dyestuff is when dry a dark powder soluble in concentrated sulphuric acid with a greenish blue color and dyes vegetable fibers from a sodium sulphide bath bright and fast green shades.

WERNER ZERWECK.
WILHELM HECHTENBERG.